United States Patent [19]
Taguchi

[11] Patent Number: 5,815,080
[45] Date of Patent: Sep. 29, 1998

[54] COMMUNICATION APPARATUS

[75] Inventor: Tomishige Taguchi, Urawa, Japan

[73] Assignee: Canon Kabushiki Kaisha, Tokyo, Japan

[21] Appl. No.: 601,820

[22] Filed: Feb. 15, 1996

Related U.S. Application Data

[63] Continuation of Ser. No. 145,233, Nov. 3, 1993, abandoned.

[30] Foreign Application Priority Data

Nov. 6, 1992 [JP] Japan .................................. 4-296758

[51] Int. Cl.$^6$ ................................................. G08B 21/00
[52] U.S. Cl. ......................... 340/635; 379/96; 379/201; 395/326; 395/329; 395/330; 395/348
[58] Field of Search .................................... 340/318, 308, 340/635, 870.07, 525; 379/94–98, 201, 207; 348/153, 154; 395/326, 327, 329, 330, 331, 332, 348; 364/146, 188

[56] References Cited

U.S. PATENT DOCUMENTS

| | | | |
|---|---|---|---|
| 4,516,156 | 5/1985 | Fabris et al. | 358/85 |
| 4,823,914 | 4/1989 | McKinney et al. | 187/133 |
| 4,860,111 | 8/1989 | Shimizu et al. | 358/400 |
| 4,951,029 | 8/1990 | Severson | 340/506 |
| 4,962,473 | 10/1990 | Crain | 340/825.37 |
| 5,195,086 | 3/1993 | Baumgartner et al. | 370/62 |
| 5,220,674 | 6/1993 | Morgan et al. | 395/800 |
| 5,323,393 | 6/1994 | Barrett et al. | 370/85.8 |
| 5,375,068 | 12/1994 | Palmer et al. | 364/514 |

*Primary Examiner*—Jeffery A. Hofsass
*Assistant Examiner*—Ashok Mannava
*Attorney, Agent, or Firm*—Fitzpatrick, Cella, Harper & Scinto

[57] ABSTRACT

A communication apparatus comprehensively displays external equipments connected its own station and a destination station. A control CPU 26 repeatedly examines the presence or absence of the connected external equipments and the signal input status from the external equipments by a video input/output circuit 12, an audio input/output circuit 16 and a digital data input/output circuit 20 and stores that information in an internal status flag memory. Similar information from the destination station is also stored in the status flag memory. The available external equipments are displayed by icons on liquid crystal displays of a drawing tablets 64 and 66 in accordance with the information stored in the status flag memory.

33 Claims, 16 Drawing Sheets

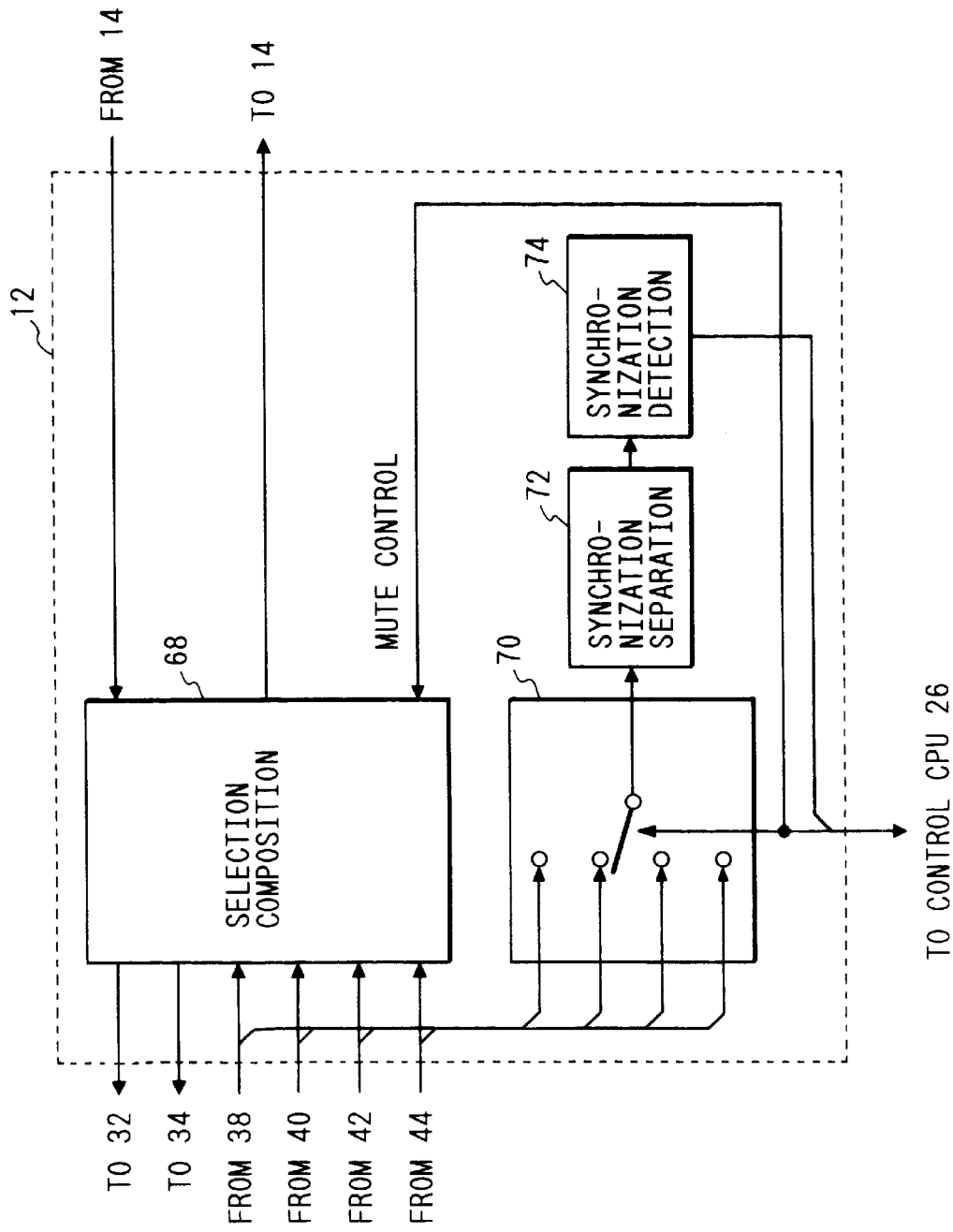

FIG. 7

| CONNECTION APPARATUS | | OPERATING STATE | CONTROL FUNCTION |
|---|---|---|---|
| INPUT APPARATUS | COMPLETE VIEW CAMERA 38 UNIVERSAL HEAD 48 | IMAGE SIGNAL IS BEING TRANSMITTED NORMALLY TO DESTINATION STATION | UNIVERSAL HEAD CONTROL POSSIBLE, DIAPHRAGM CONTROL POSSIBLE, ZOOM CONTROL POSSIBLE, FOCUS AUTOMATIC |
| | PERSON CAMERA 40 UNIVERSAL HEAD 50 | NORMAL OPERATION | UNIVERSAL HEAD CONTROL POSSIBLE, DIAPHRAGM CONTROL POSSIBLE, ZOOM CONTROL POSSIBLE, FOCUS AUTOMATIC |
| | WRITE/PICTURE CAMERA 42 | NORMAL OPERATION | DIAPHRAGM CONTROL POSSIBLE, ZOOM CONTROL POSSIBLE, FOCUS AUTOMATIC |
| | VTR 44 | POWER ON | PICTURE RECORDING CAN BE STARTED BY REMOTE CONTROL |
| | COMPLETE VIEW MICROPHONE 52 | NORMAL OPERATION | AUDIO MUTE POSSIBLE |
| | MICROPHONE 54 FOR SPEAKER | NORMAL OPERATION | AUDIO MUTE POSSIBLE |
| | MICROPHONE 56 FOR SPEAKER | NORMAL OPERATION | AUDIO MUTE POSSIBLE |
| | VTR AUDIO JACK | CONNECTED | AUDIO MUTE POSSIBLE |
| OUTPUT APPARATUS | MONITOR 32 | CONNECTED (NO CONNECTION CONFIRMATION CIRCUIT) | BRIGHTNESS ADJUSTING POSSIBLE |
| | MONITOR 34 | CONNECTED (NO CONNECTION CONFIRMATION CIRCUIT) | BRIGHTNESS ADJUSTING POSSIBLE |
| | SPEAKER 51 | CONNECTED (NO CONNECTION CONFIRMATION CIRCUIT) | VOLUME CONTROL POSSIBLE |
| | VIDEO PRINTER 36 | ON STANDBY | PRINT START/STOP CONTROL POSSIBLE |
| | VTR 44 | CONNECTED | PICTURE RECORDING START/STOP CONTROL POSSIBLE |
| DIGITAL INPUT/ OUTPUT | G4 FAX58 | CONNECTED | OPERATION CONTROL BY GP-IB INTERFACE |
| | ELECTRON WHITE PLATE 60 | CONNECTED | OPERATION CONTROL BY RS232C INTERFACE |
| | PERSONAL COMPUTER 62 | CONNECTED | OPERATION CONTROL BY SCSI INTERFACE |

FIG. 8

| CONNECTION APPARATUS | | OPERATING STATE | CONTROL FUNCTION |
|---|---|---|---|
| INPUT APPARATUS | COMPLETE VIEW CAMERA 138 UNIVERSAL HEAD 148 | IMAGE SIGNAL IS BEING TRANSMITTED NORMALLY TO DESTINATION STATION | UNIVERSAL HEAD CONTROL POSSIBLE, DIAPHRAGM CONTROL POSSIBLE, ZOOM CONTROL POSSIBLE, FOCUS AUTOMATIC |
| OUTPUT APPARATUS | MONITOR 132 | CONNECTED (NO CONNECTION CONFIRMATION CIRCUIT) | BRIGHTNESS ADJUSTING POSSIBLE |
| | SPEAKER 151 | CONNECTED (NO CONNECTION CONFIRMATION CIRCUIT) | VOLUME CONTROL POSSIBLE |
| | VIDEO PRINTER 136 | ON STANDBY | PRINT START/STOP CONTROL POSSIBLE |
| DIGITAL INPUT/ OUTPUT | G4 FAX158 | CONNECTED | OPERATION CONTROL BY GP-IB INTERFACE |
| | PERSONAL COMPUTER 162 | CONNECTED | OPERATION CONTROL BY SCSI INTERFACE |

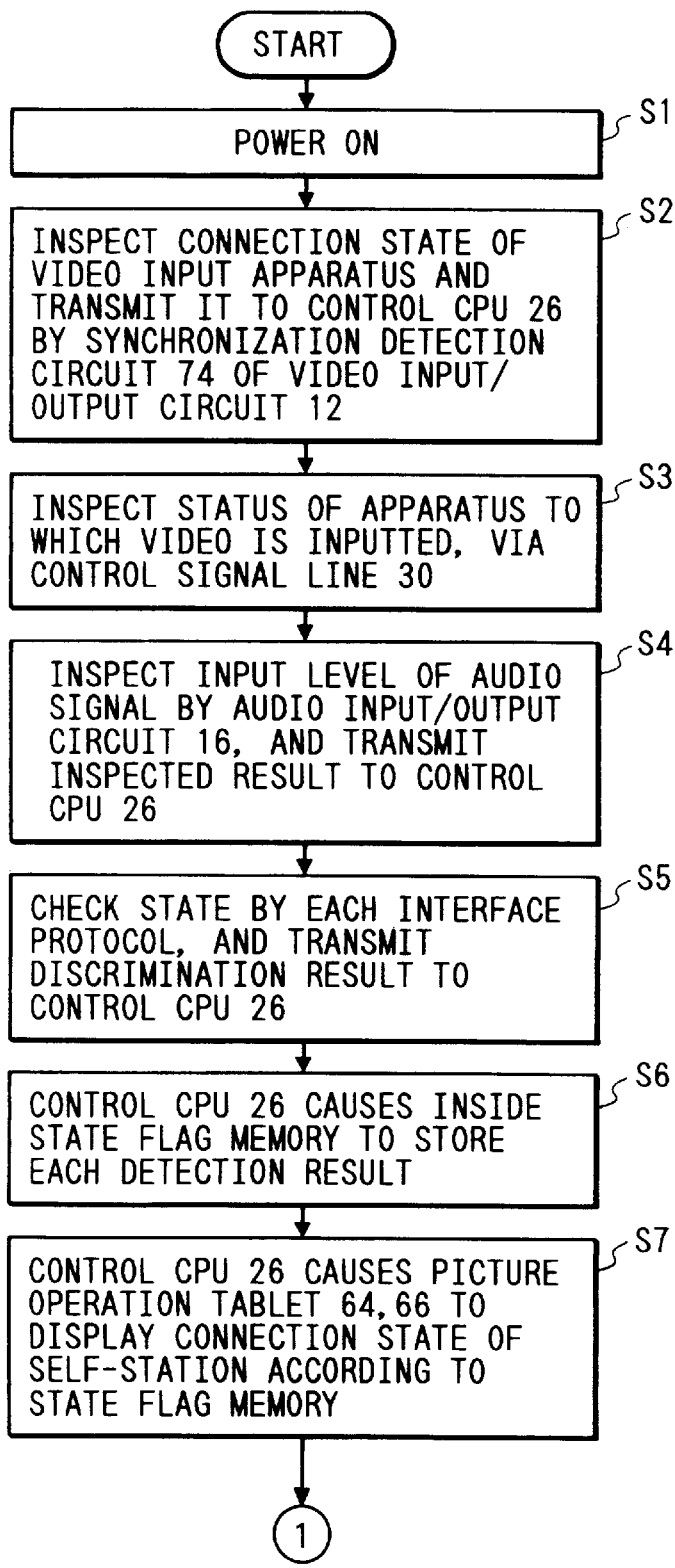

FIG. 13

| ; | TYPE | FOCUS | DIAPHRAGM | ZOOM | UNIVERSAL FUNCTION |

FIG. 16

| ; | CONTROL OBJECT APPARATUS | OPERATION INSTRUCTION | EXPANSION FLAG | ----- |

COMMUNICATION APPARATUS

This application is a continuation of application Ser. No. 08/145,233 filed Nov. 3, 1993 now abandoned.

BACKGROUND OF THE INVENTION

1. Field of the Invention

The present invention relates to a communication apparatus, and more particularly to a communication apparatus for communicating sound, image and data such as a TV telephone apparatus or a TV conference system.

2. Related Background Art

The standardization of communication schemes in coordinately communicating image, sound and data has recently been reviewed, and various TV conference systems and communication terminals therefor have been developed and commercialized.

However, to date, the communication scheme being reviewed relates to the data format for communication lines, and even if the communication scheme is met, various problems may arise when communication terminals of the same or different manufacturers are interconnected because the system configuration and the operation condition of the destination station are not known. For example, when the transmitting station transmits an animation image so that it is recorded on a video tape in the receiving station but a video tape recorder is not connected in the receiving station, or power is not on, the transitted animation image is wasted.

An image input device includes a video camera, a still camera, a video tape player and a video disk player, and an image output device include a video printer, a video tape recorder and a monitor. Those devices should be connected and powered on in accordance with a particular object of the communication. Further, the resolutions of the input/output images should match from the stand point of high quality image.

SUMMARY OF THE INVENTION

It is an object of the present invention to provide a communication apparatus having an improved user operability.

It is another object of the present invention to provide a communication apparatus which can recognize a status of a destination station.

It is another object of the present invention to provide a multi-media apparatus of high user operability which can be connected to various apparatus.

In order to achieve the above objects, in accordance with a preferred embodiment of the present invention there is provided a communication apparatus for transmitting and receiving information through a communication line comprising:

examination means for examining a connection status of plural external equipments connected in its own station;

connection information transmitting and receiving means for transmitting a result examined by the examination means to a destination station and receiving information of connection status of external equipments connected in the destination station; and informing means for informing the connection status of the own station and the destination station.

Accordingly, which ones of the selectively connectable external equipments are connected in the own station and the destination station and which ones are available, can be detected. Thus, it is not necessary to examine the presence or absence of the external equipments by a remote control signal, and the operability is significantly improved.

It is another object of the present invention to provide a multi-media apparatus which plainly displays a status of the apparatus.

Other objects and features of the present invention will be apparent from the following description of the preferred embodiments and the drawings thereof.

BRIEF DESCRIPTION OF THE DRAWINGS

FIG. 3 shows a block diagram of a video input/output circuit 12, FIG. 7 shows a table of equipments connected in the own station shown in FIG. 1 and functions thereof, FIG. 8 shows a table of equipments connected in the destination station shown in FIG. 6 and functions thereof, FIG. 9 shows a portion of an operation flow chart of an embodiment, FIG. 16 shows a format of a remote control signal.

DETAILED DESCRIPTION OF THE PREFERRED EMBODIMENTS

An embodiment of the present invention is now explained with reference to the drawings.

Figure 1:
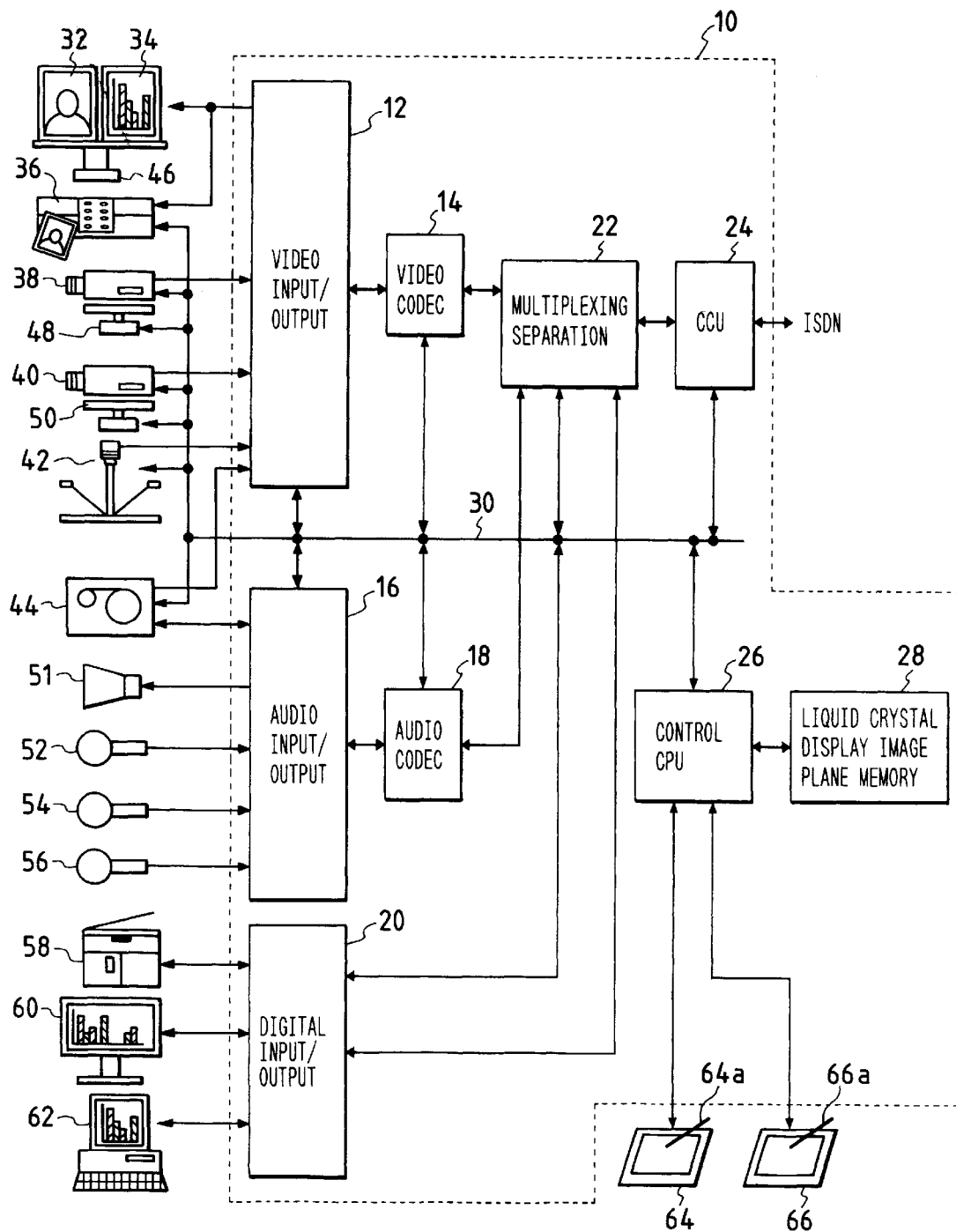
FIG. 1 shows a block diagram of a configuration of one embodiment of the present invention.

FIG. 1 shows one embodiment of the present invention applied to a TV conference system and shows a block diagram of a configuration with all possible peripheral equipments connected.

A system main unit 10 comprises a video signal input/output circuit 12, a video CODEC 14 for compressing and decompressing a video signal, an audio input/output circuit 16, an audio CODEC 18 for compressing and decompressing an audio signal, a digital data input/output circuit 20, a multiplexor/demultiplexor 22 for multiplexing and demultiplexing transmitted and received data, a communication control unit (CCU) 24 for controlling the connection with a communication line, a control CPU 26 for controlling the overall system, and a memory 28 to be described later for storing display information of a liquid crystal display device for displaying the connection configuration of the own station and the destination station and operation status thereof. The control CPU 26 controls the circuits 12–24 and an external device to be described later through a control signal line 30.

The video CODEC 14 compresses the image signal to be transmitted in accordance with a capacity of communication of a communication line and a designated image quality and decompresses the received compressed image signal. The decompression scheme may be the CCITT H261 for an animation image and the JPEG scheme for a still image.

The audio CODEC 18 compresses an audio signal to be transmitted by PCM or ADPCM and decompresses the received compressed signal.

Connected to the video input/output circuit 12 of the main unit 10 are a monitor 32 for displaying person, scenery and text picture, a non-interlaced monitor 34 for displaying graphic and characters, a video printer 36, a full scene camera 38 for picking up a full scene of a conference room, a portrait camera 40 for picking up each speaker, a write/picture camera 42 for photographing a character original on a plate for an original and a three dimensional object, and a video tape recorder (VTR) 44. The monitors 32 and 34 are placed on a monitor table 46 and the full scene camera 38 is mounted on a universal head 48. The portrait camera 40 is mounted on a universal head 50. The cameras 38 and 40 have zoom functions, and they may be panned and tilted in any direction by controlling the universal heads 48 and 50 by a control signal 30.

Connected to the audio input/output circuit 16 are a speaker 51, a non-directional microphone 52, a first speech microphone 54, a second speech microphone 56 and a video input/output terminal of the VTR 44.

Connected to the digital data input/output terminal 20 are a G4 standard facsimile machine 58, an electronic white board 60 and a personal computer 62.

Figure 2:
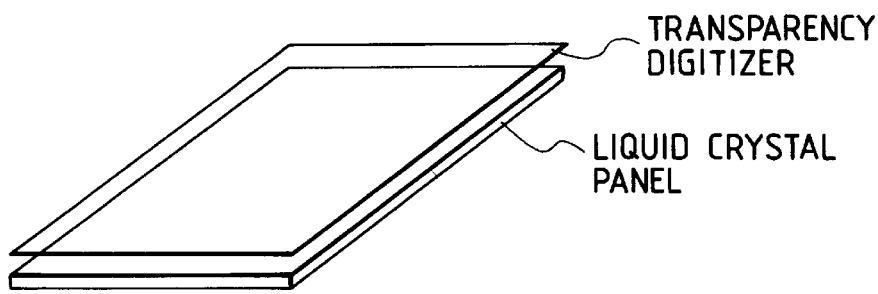
FIG. 2 shows a developed perspective view of a drawing tablets 64 and 66.

Connected to the control CPU 26 are two drawing tablets 64 and 66 each having an input panel (such as a transparent digitizer) for inputting various commands to the main unit 10 integrally overlaid on a liquid crystal display panel (which may be FLCD) for icon-displaying system configurations of the own and destination stations and the operation status thereof. Inputs are made through input pens 64a and 66a. FIG. 2 shows a developed perspective view of the drawing tablets 64 and 66.

FIG. 3 shows a detailed block diagram of the video input/output circuit 12. A selective composition circuit 68 of the video input/output circuit 12 composes or selects the video signals from the cameras 38, 40 and 42, the video signal from the VTR 44 and the video signal from the video CODEC 14 depending on a picture-in-picture system or a window display system in accordance with the control signal from the control CPU 26 and outputs it to the monitors 32 and 34 and/or the video CODEC 14.

As will be described in detail, a switch 70 sequentially selects the video signal input lines from the cameras 38, 40 and 42 and the VTR 44 and supplies them to a synchronous separation circuit 72 which separates horizontal and vertical synchronous signals from the input signal. A synchronous detection circuit 74 determines whether it is a predetermined synchronous signal or not by a period of the signal separated by the synchronous separation circuit 72 and transfers the result to the control CPU 26. By doing so, which image input devices are connected and operated is determined.

Figure 4:
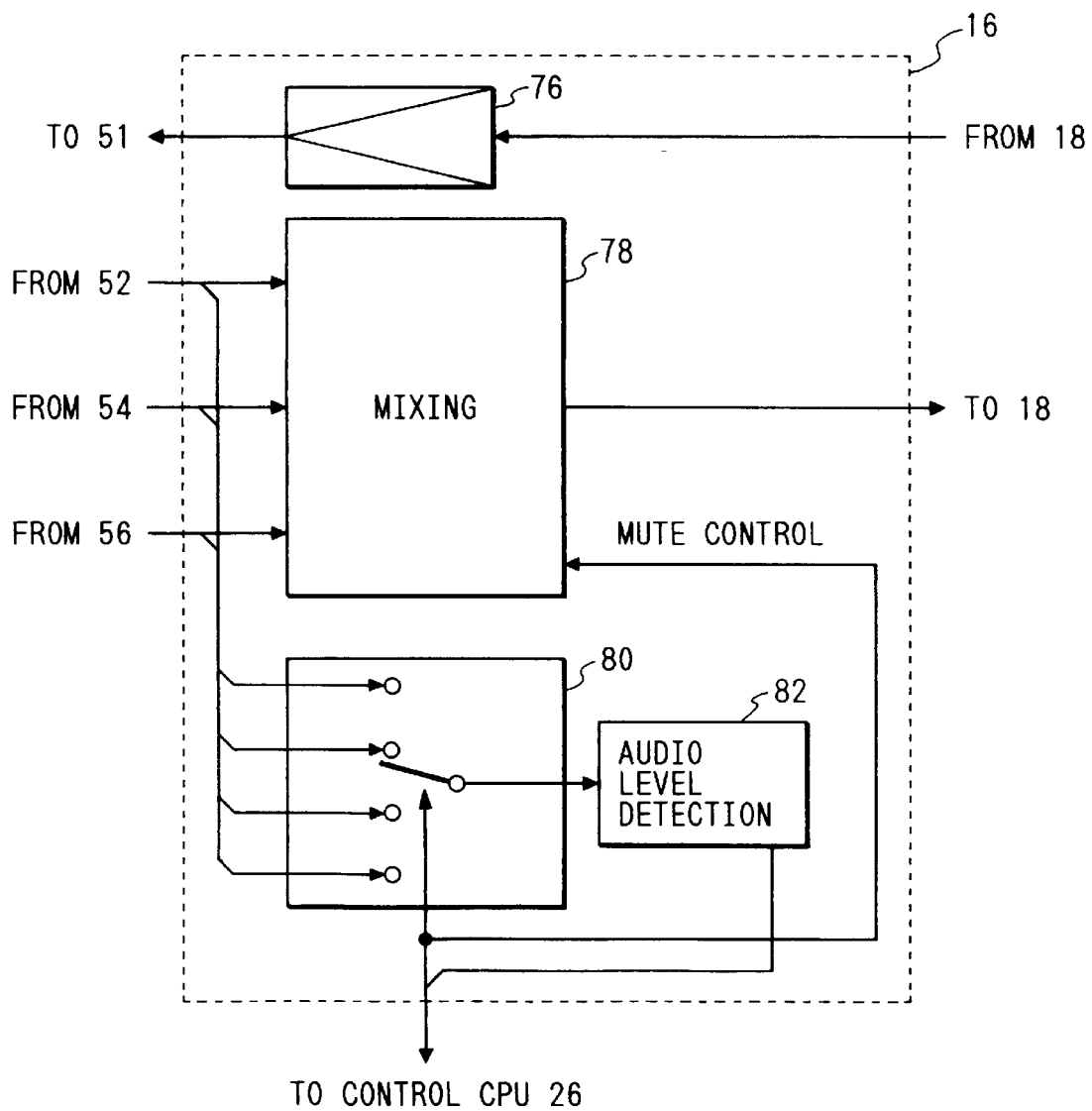
FIG. 4 shows a block diagram of an audio input/output circuit 16, FIG. 5 hows a block diagram of a digital data input/output circuit 20.

FIG. 4 shows a detailed block diagram of the video input/output circuit 16. An amplifier 76 amplifies the audio signal received from the audio CODEC 16 and outputs it to the speaker 51. A mixer 78 selectively mixes the output audio signals from the microphones 52, 54 and 56 in accordance with the control signal from the control CPU 26 and outputs it to the audio CODEC 16.

A switch 80, like the switch 70, sequentially selects the audio signal input lines from the microphones 52, 54 and 56 and supplies them to an audio level detector 82 which detects an audio level of the input signal, that is, the presence and absence of the input sound. Thus, it is detected which ones of the microphones 52, 54 and 56 are operating or receiving sound. The result is transferred to the control CPU 26.

Figure 5:
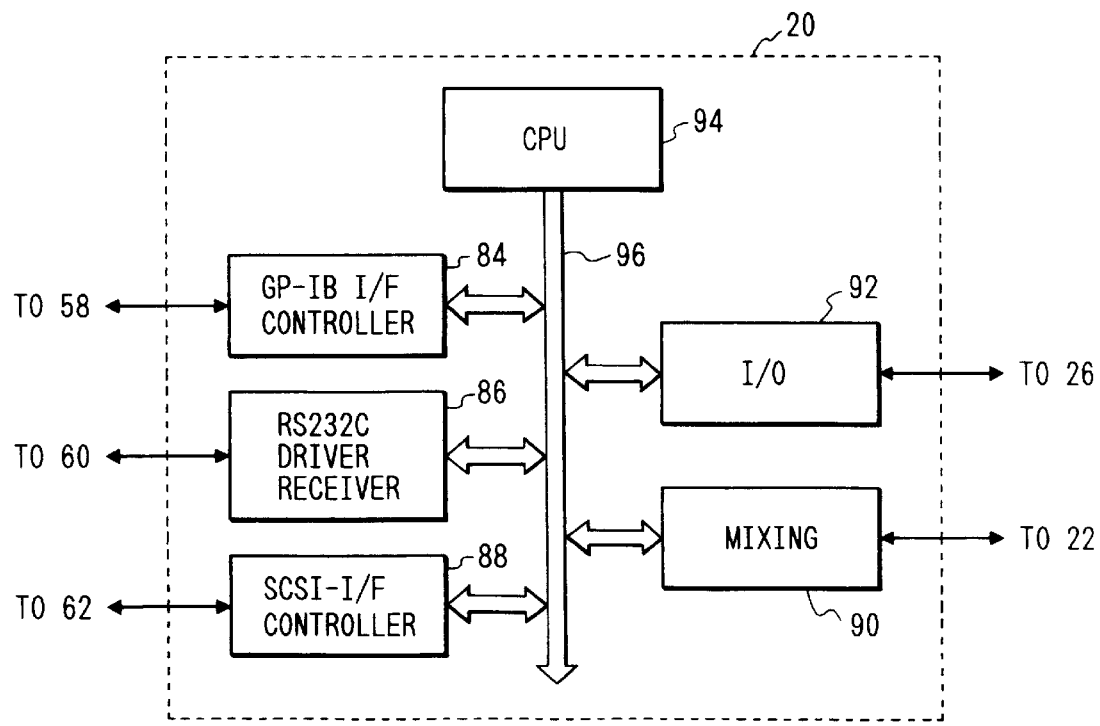

FIG. 5 shows a detailed block diagram of the digital data input/output circuit. A GB-IB interface controller 84 for connecting the G4 facsimile machine 58, an RS232C driver receiver 86 for connecting the electronic white board 60, a SCSI interface controller 88 for connecting the personal computer 62, a mixer 90 for connecting the multiplexor/demultiplexor 22, and an input/output circuit 92 for connecting to the control CPU 26 through a control signal line 30 are provided. Those units are controlled by a CPU 94 through an address/data bus 96.

The flow of video, audio data and control signals and the process flow in the system of FIG. 1 are identical to those in a conventional TV conference system terminal, and detailed description thereof is therefore omitted.

In the present embodiment, the equipments connected in the destination station and the operation status thereof are automatically checked at the instruction of a user or automatically at an appropriate timing, that is, at the start of communication or at a predetermined time interval, and they are informed communicated to the user. The information may be displayed as an image on the drawing tablets 64 and 66, and the equipments connected in the own station and the operation status thereof may also be displayed. The function is explained in detail.

Figure 6:
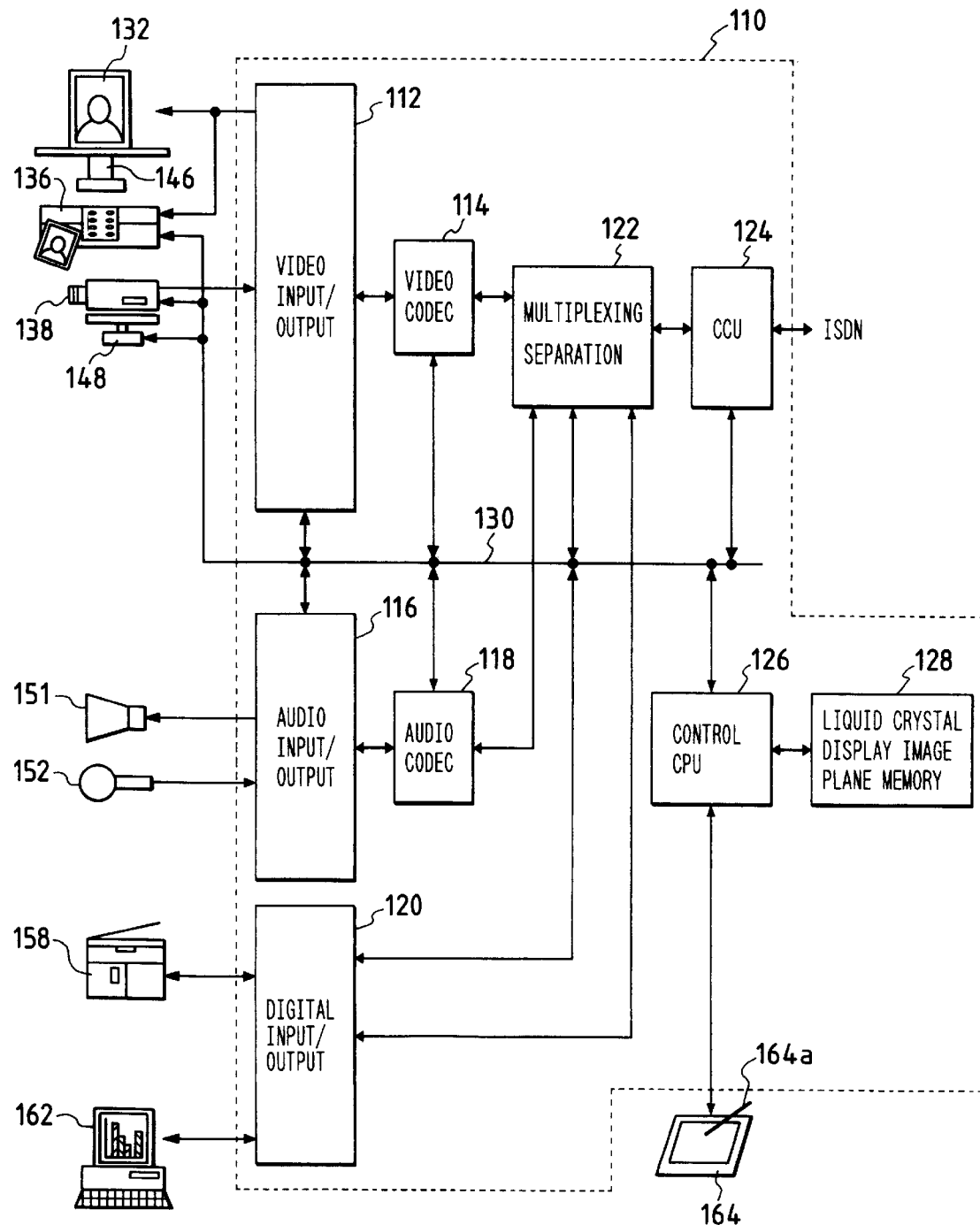
FIG. 6 shows a connection configuration of a destination station.

It is assumed that the destination station is configured as shown in FIG. 6. In the own station shown in FIG. 1, all external equipments and peripheral equipments that may be connected are connected while in the destination station shown in FIG. 6, portions of the external equipments or the peripheral equipments are disconnected. In FIG. 6, the elements having the same capabilities or performance as those of the elements shown in FIG. 1 are designated by the same numerals with the addition of 100. Namely, the full-scene camera 138 (FIG. 6) of the destination station has the same performance and function as those of the full-scene camera 38 (FIG. 1) of the own station.

FIG. 7 shows a table of the connection status of the equipments connected in the own station shown in FIG. 1 and the functions thereof, and FIG. 8 shows a table of the connection status of the equipments connected in the destination station shown in FIG. 6 and the functions thereof. The control CPU's 26 and 126 check and store the information shown in the tables through the communication with the peripheral equipments. The functions and the connection status of those peripheral equipments may be manually inputted.

Figure 10:
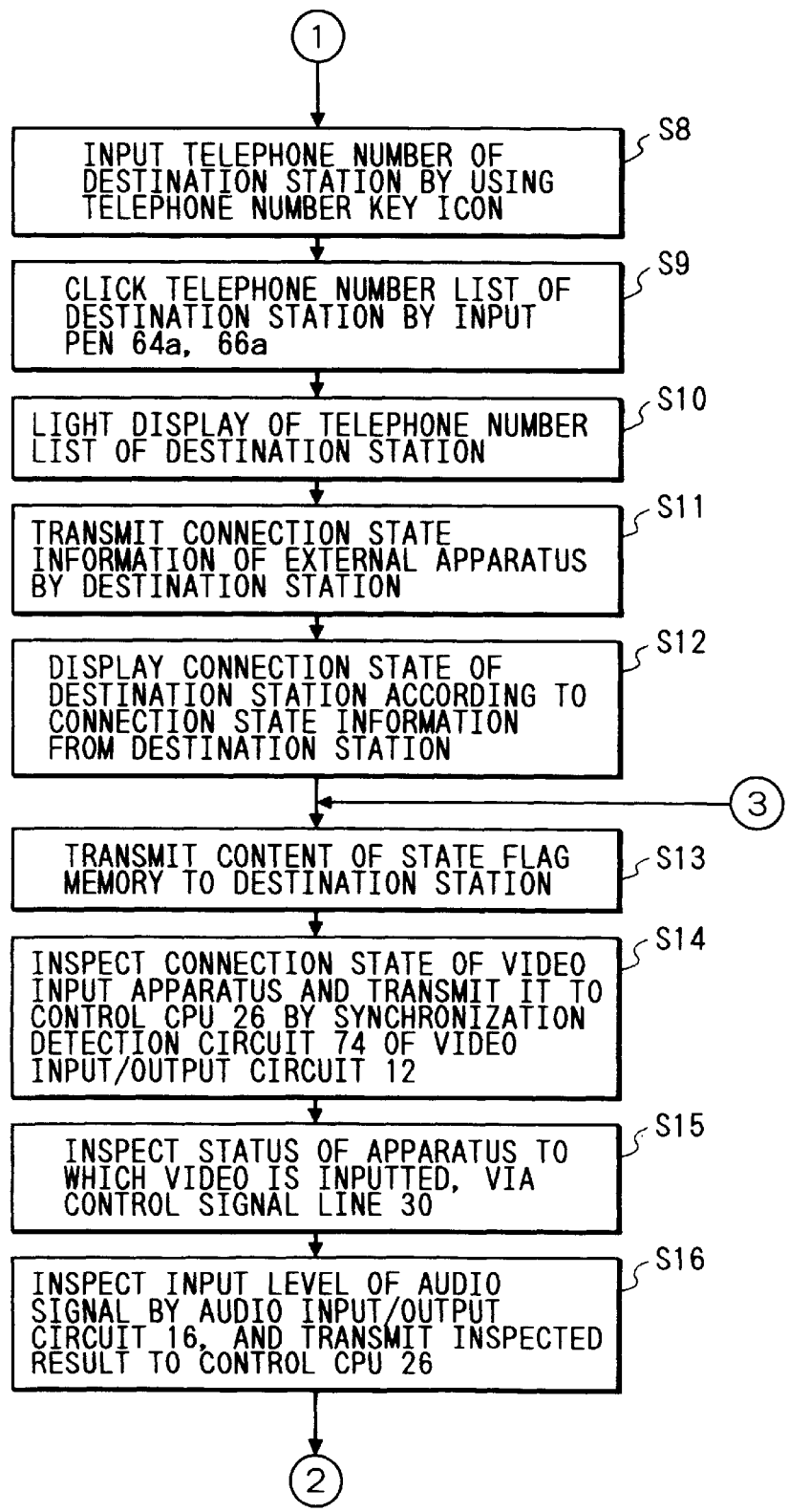
FIG. 10 shows a portion of the operation flow chart of the embodiment.
Figure 11:
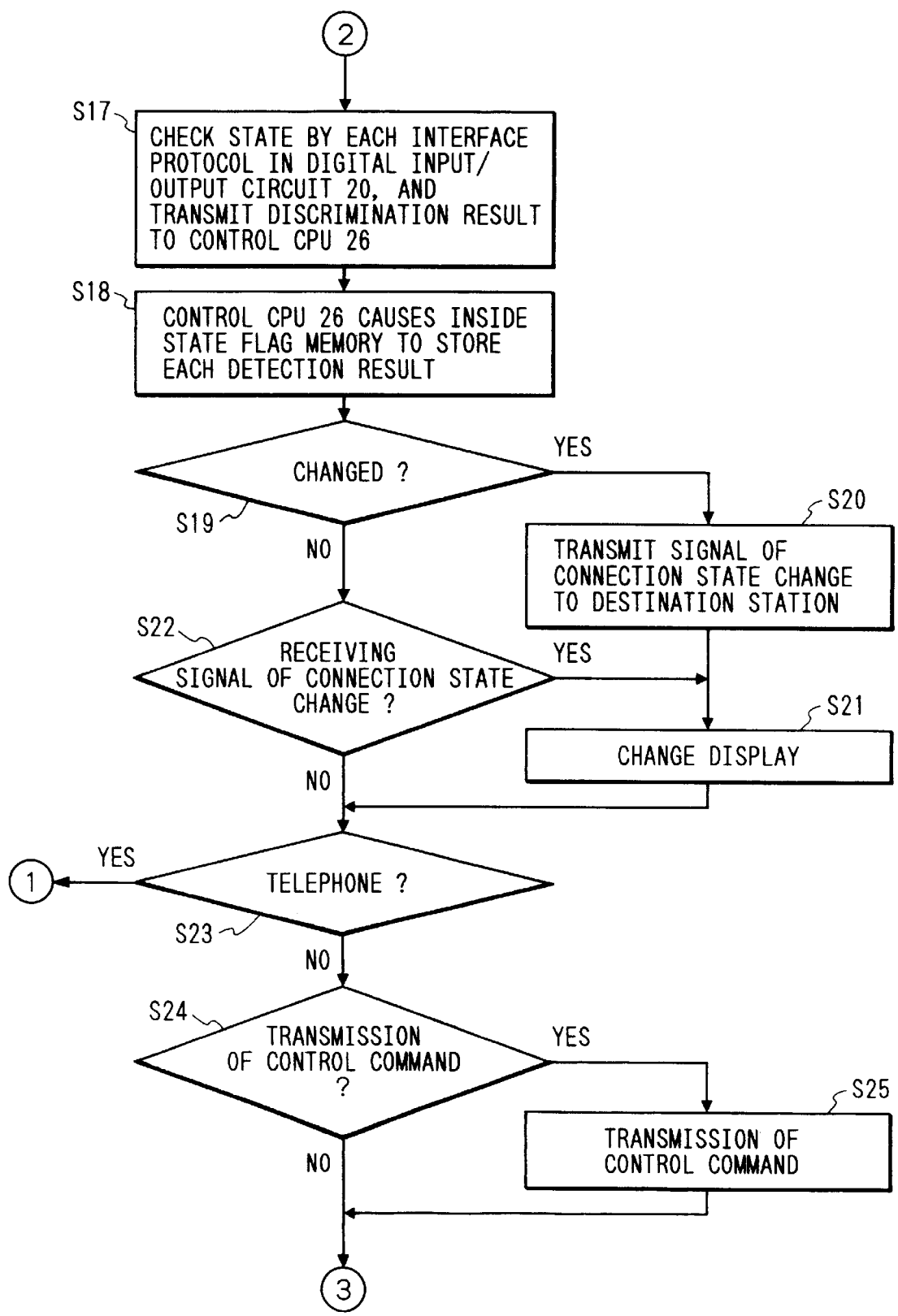
FIG. 11 shows a portion of the operation flow chart of the embodiment.

A characteristic operation of the present embodiment to display the connection status and the function status of the equipments connected in the own station and the destination station is now explained. FIGS. 9, 10 and 11 show operational flow charts.

Figure 12:
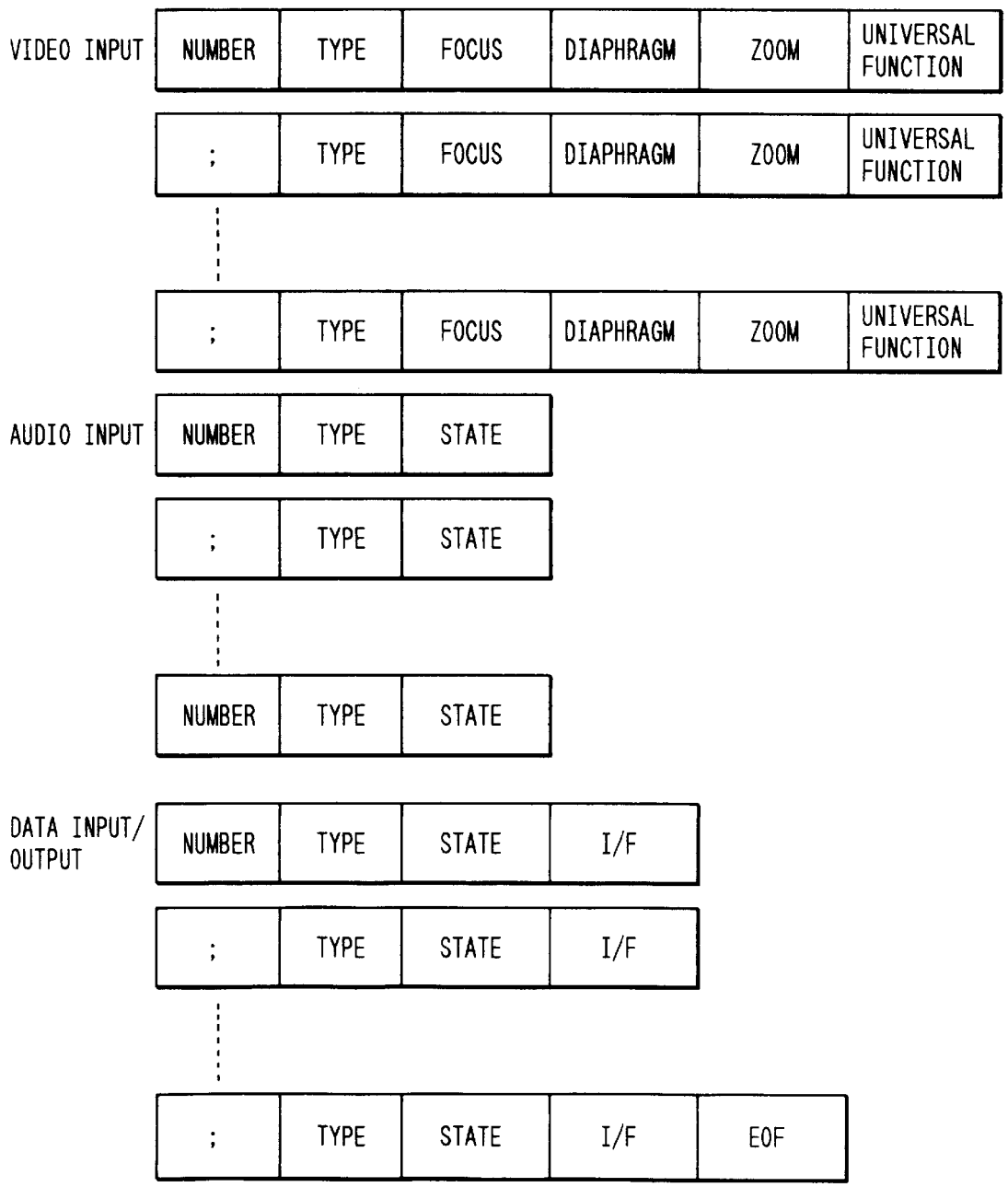
FIG. 12 shows a content of a status flag memory, FIG. 13 hows a format of a status reply signal.

The control CPU 26 stores the presence or absence of the connection of the connectable external equipments and the functions thereof shown in FIGS. 6 and 7 individually in an internal memory, as described above. The content of the memory structure is shown in FIG. 12.

As to the image inputs, the type of input equipment (full scene, portrait, picture, VTR or optical disk), the focal adjustment (fixed, manual or automatic), the diaphragm (fixed, manual or automatic), the zoom (fixed, manual or automatic) and the universal head function (none, manual or automatic tracking) are stored. As to the audio inputs, the type of input equipment (non-directional microphone, speech microphone, VTR, optical disk player or tape recorder) and the presence or absence of the sound are stored. As to the digital equipments, the type of equipment (electric white board, personal computer, work satiation or G4 facsimile machine), the status (stand-by or active) and the interface (deducted, SCSI, RS232C, GPIB or RS422) are stored.

The operation is now explained. As shown in FIG. 9, when the own station is powered on (S1), the control CPU 26 starts the checking of the status of the connected external equipments after the initialization. First, it sequentially switches the video input signal lines by the switch 70 of the video input/output circuit 12. The synchronous detector 74 detects whether there is a synchronization signal on the video signal input line or not, and transfers the result to the control CPU 26 (S2).

The control CPU 26 sends a status reply request command to the external equipment having the video signal input through the control signal line 30, and requests information on the type of input equipment, and the functions of the focus adjustment, the diaphragm, the zoom and the universal head (S3). The inquired external equipment transfers the information on the type of input equipment and the functions of the focus adjustment, the diaphragm, the zoom and the universal head to the control CPU 26 through the control signal line 30 in a format shown in FIG. 13.

The control CPU 26 then examines the connected audio input equipments by the audio input/output circuit 16 (S4). Specifically, it sequentially switches the switch 80. The audio level detector 82 compares the output level of the switch 80 with a predetermined threshold to determine the presence or absence of the microphones 52, 54 and 56 and transfers the result to the control CPU 26.

The control CPU 26 further inquires to the digital data input/output circuit 20 to examine the external equipment connected to the circuit 20 (S5). The CPU 94 of the circuit 20 examines the presence or absence of the connection through the interface and transfers the result to the control CPU 26 through the I/O circuit 92.

The control CPU 26 stores the detection results on the video input equipment, the audio input equipment and the data input/output equipment in the internal memory (status flag memory) (S6). The control CPU 26 develops display pattern data for displaying the status of the own station into the memory 28 in accordance with the content of the status flag memory and displays the status of the own station on the drawing tablets 64 and 66 (S7). The transfer from the control CPU 26 to the drawing tablets 64 and 66 may be in a dot image or a command with a page description language, and only a modified portion may be sent or a full image may be sent.

Figure 14:
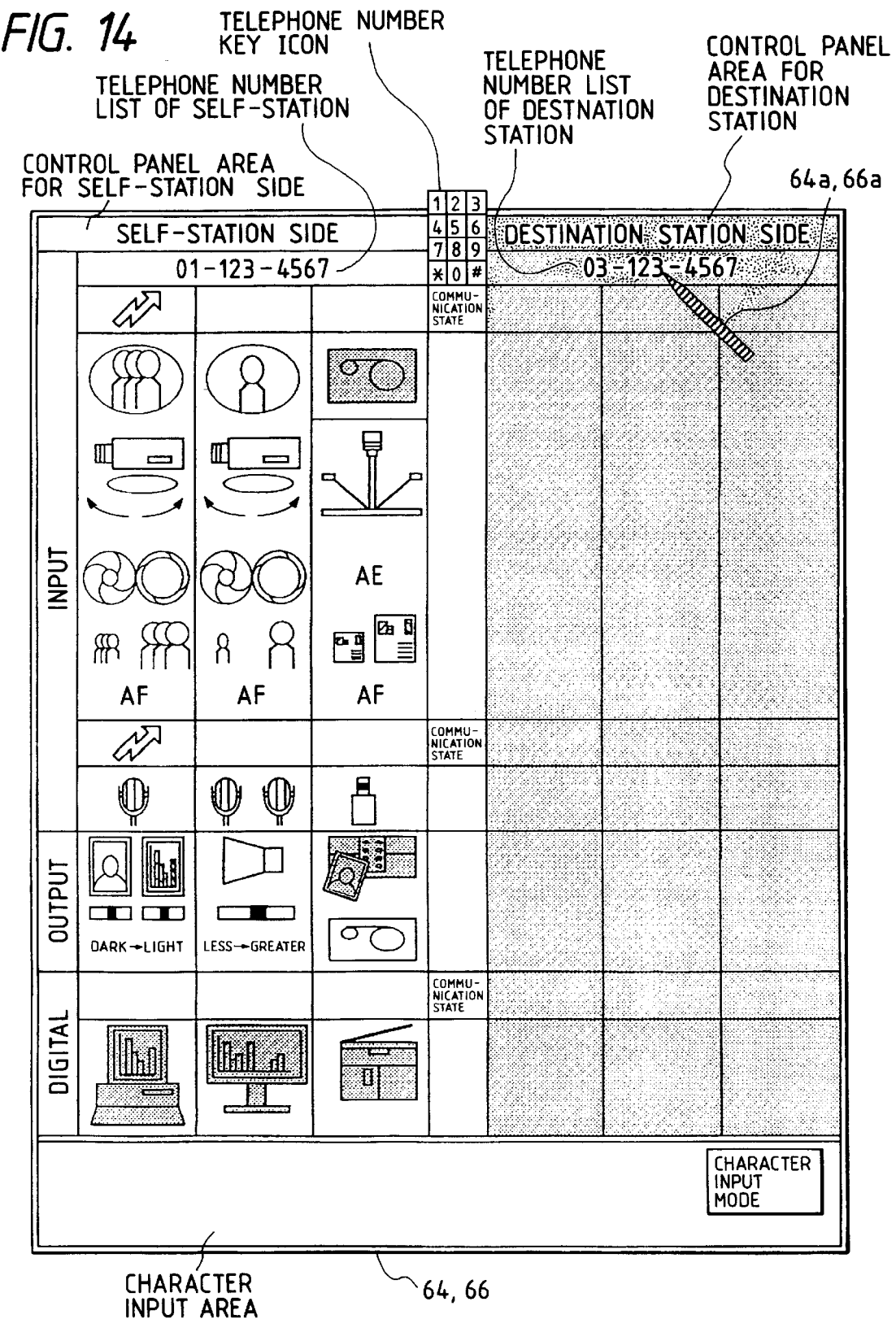
FIG. 14 shows a display of the drawing tablets 64 and 66 after the test of the equipments connected in the own station.

The drawing tablets 64 and 66 have an area for displaying the equipments connected in the own station and an area for displaying the equipments connected in the destination station, and an image shown in FIG. 14 is displayed. The connected external equipments are displayed by corresponding icons so that the connected equipments are clearly displayed but the disconnected equipments are not displayed. The equipments which are connected but inactive (power off, sleeping or no signal input/output status) are displayed in gray or reversed.

The method per se for discriminating the two status, active (valid) and inactive (invalid) by the brightness or color is known in the art, and any existing method may be used. In FIG. 14, the video printer 36, the VTR 44, the G4 facsimile machine 58, the electronic white board 60 and the personal computer 62 are connected but since there is no signal input/output, they are displayed in gray.

The confirmation and the display of the connected equipments are repeatedly or periodically performed under a predetermined condition.

After the confirmation and display of the equipments connected in the own station, a telephone number icon is displayed on the drawing tablets 64 and 66. The numbers of the telephone number key icons are sequentially clicked by the input pens 64a and 66a so that the input numbers are sequentially displayed in the destination station telephone number column in the destination station control panel area. After the entry of the telephone number, the destination station number column is double-clicked. Thus, the destination station telephone number is inputted to the control CPU 26 and the control CPU 26 starts the telephone calling by the CCU 24. Druing the calling, the control CPU 26 flashes the display of the destination station telephone number column (S8, S9 and S10). When the line is connected, the flash of the display of the destination station telephone number is stopped and the display is brightened (S11).

Figure 15:
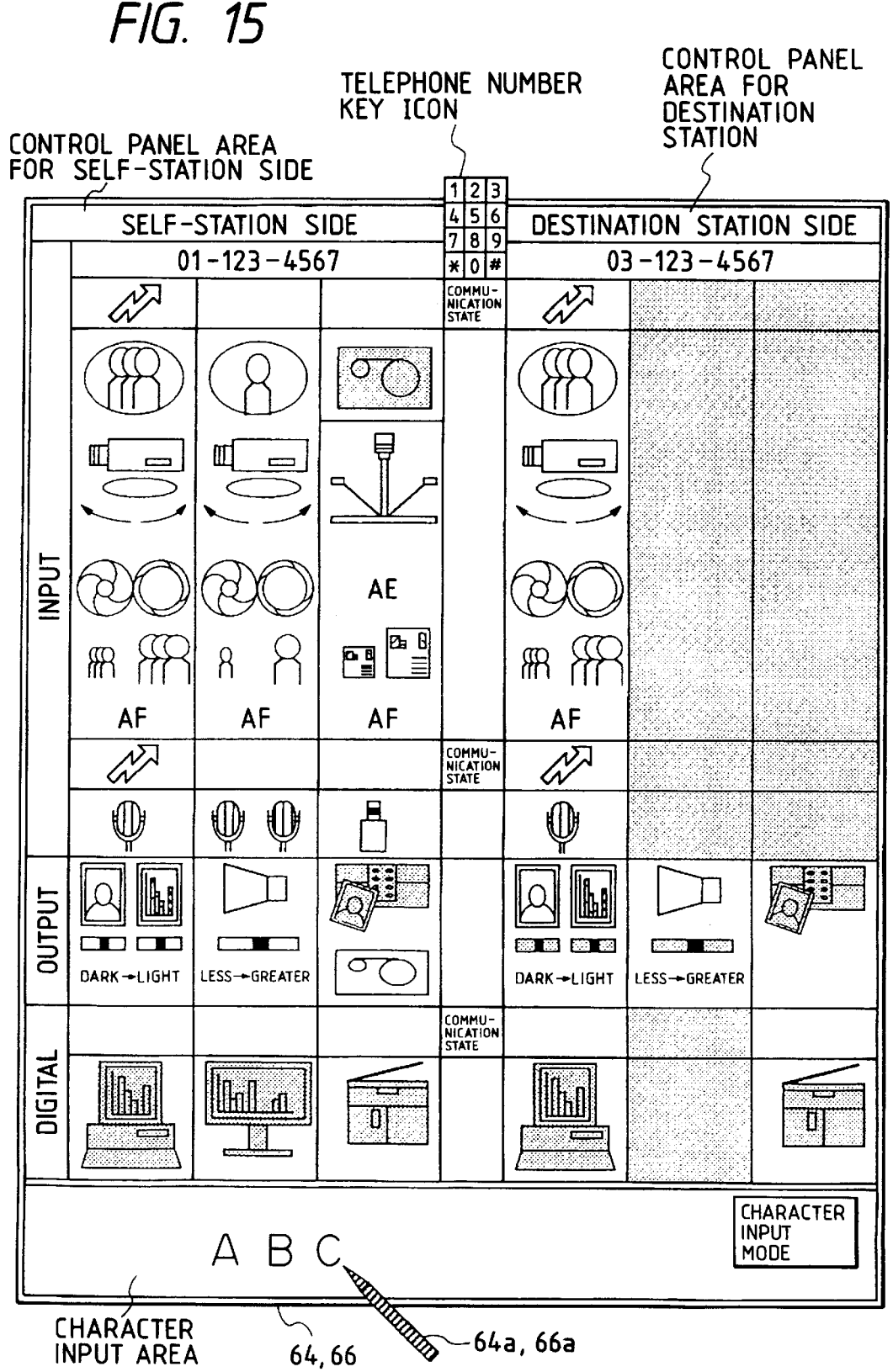
FIG. 15 shows a display of the drawing tablets 64 and 66 after the reception of the connection status information of the destination station.

After the line has been established, the destination station sends the connection status information stored in its own status flag memory (S12). The own station displays the connected equipments (including the functions and the operation status) by icons in the destination station control panel area of the drawing tablets 64 and 66 as it does for the own station. FIG. 15 shows a display of the destination station control panel area of the drawing tablets 64 and 66 when the destination station has the connection configuration as shown in FIG. 6.

The own station then sends the connection status information stored in the own status flag memory to the destination station (S14). Thus, the connection status of the connected external equipments of the other station is displayed on the drawing tablets of each of the stations connected through the communication line.

Then, the external equipments connected to the input/output circuits 12, 16 and 20 of the own station are again checked (S15–S18) and the status flag memory is updated (S19). If there is a change in the content of the status flag memory (S20), the change is transmitted to the destination station (S21) and the display of the drawing tablets 64 and 66 is updated (S22). When the information informing the change of the connection status is received from the destination station (S23), the display of the drawing tablets 64 and 66 is updated (S22).

When communication is to be made with other station, the process proceeds to S8 (S24).

When the orientation or the focus status of the camera in the destination station is to be controlled, a control signal is sent to the destination station in the format shown in FIG. 16 to remote control it (S25 and S26). It comprises a control signal, an identification for identifying the control signal, an equipment to be controlled, an operation command and an extended flag and it commands the auto-mode or manual mode for the focus, diaphragm and zoom and a direction of movement in the manual mode. A format of the remote control signal may be a conventional one used in the remote monitoring system or TV conference system.

For the equipment under transmission, an arrow icon is displayed in a communication status column as shown in FIG. 15 to indicate the transmission in progress. As shown in FIG. 15, characters may be entered by using input pens 64a and 66a and they are converted to character codes by a hand-written character recognition system.

Figure 17:
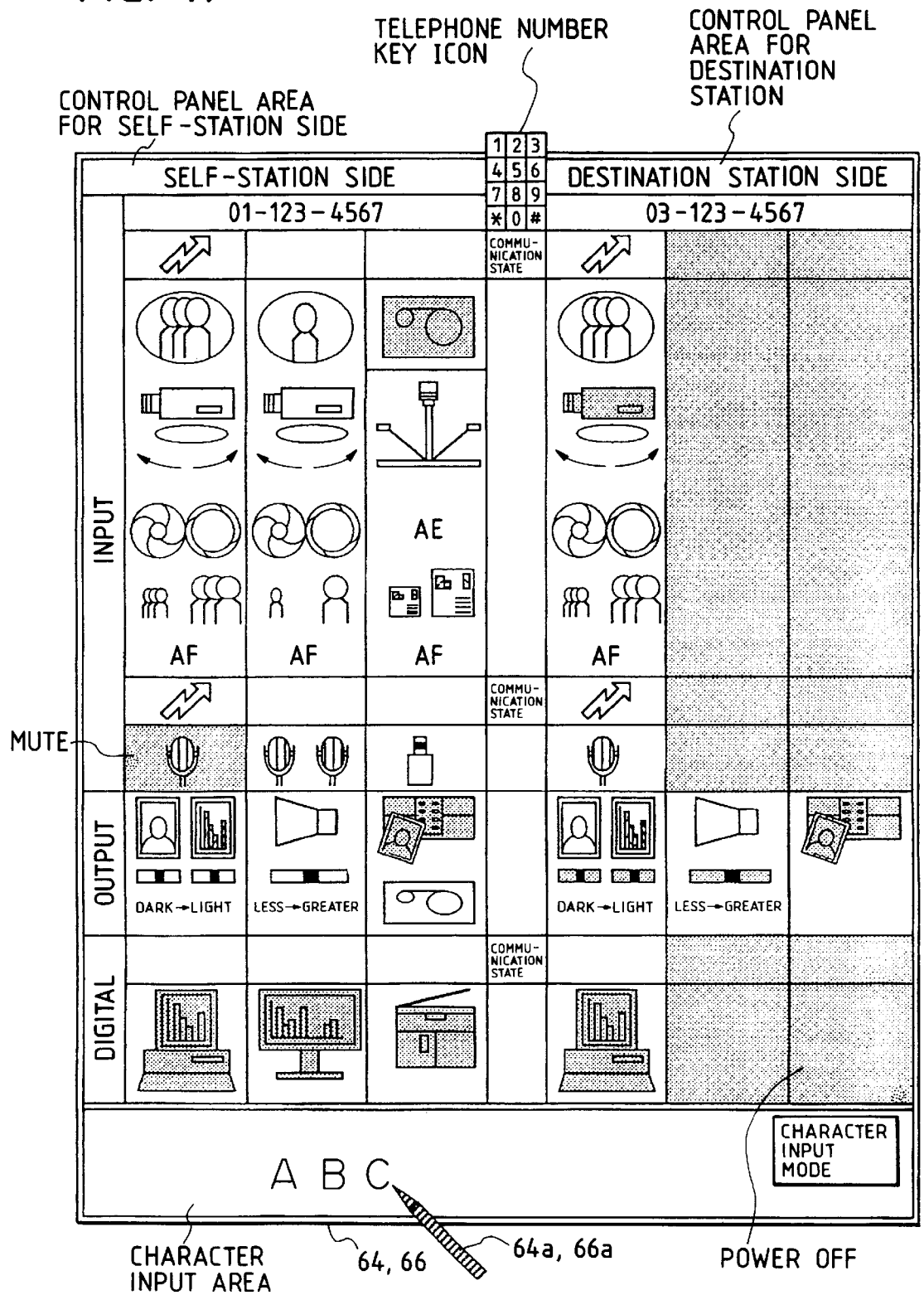
FIG. 17 shows a display of the drawing tablets 64 and 66 after the power-off and the microphone mute.

When the power of the external equipment is turned off or rendered inactive, the corresponding icon is displayed in gray. FIG. 17 shows a status when the microphone 52 of the own station is muted and the G4 facsimile machine of the destination station is powered off.

Figure 18:
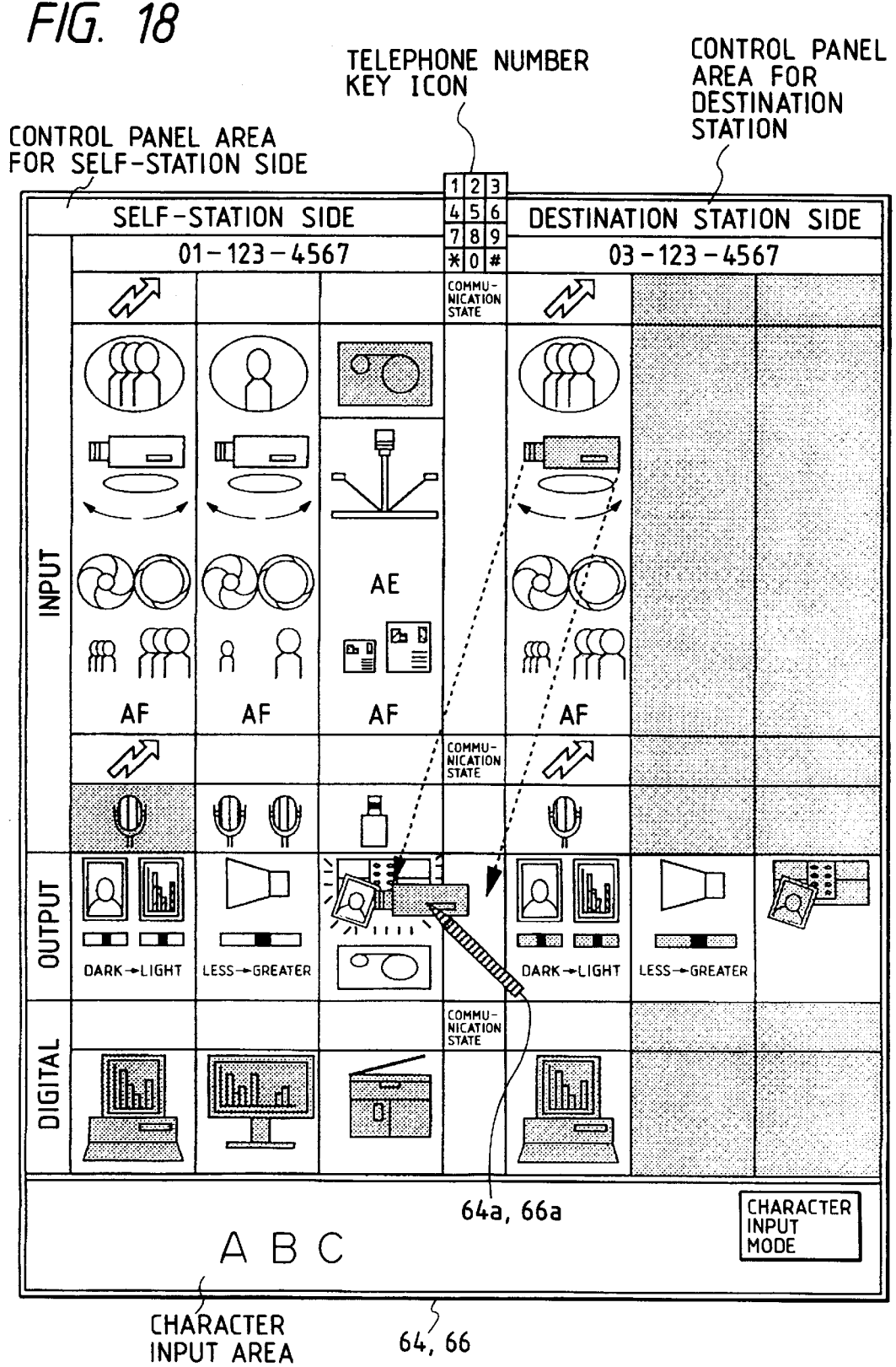
FIG. 18 illustrates a print operation of a received image.

By selecting (clicking) the icon of the image input equipment of the destination station and drugging (superimposing) the icon of the image input equipment on the icon of the image output equipment of the own station, an image from any designated image input equipment may be outputted to any designated image output equipment. In FIG. 18, a video image of the destination station is outputted on the video printer 36 of the own station. During the printing of the video printer 36, the corresponding icon is flashed. The same is applicable for the VTR recording.

While the TV conference system has been described above, the present invention is equally applicable to a multi-media system, a TV telephone, and still image communication and transmission system.

In accordance with the present embodiment, since the configuration of the equipments connected in the destination station of the information transmission is collectively informed previously, it is not necessary to confirm it by a control operation as it is required and the operability is significantly improved.

What is claimed is:

1. A communication apparatus for communicating with a partner communication apparatus, comprising:
    receiving means for receiving information of an operation state of a first peripheral device connected to the partner communication apparatus;
    first discriminating means for discriminating the operation state of the first peripheral device according to the received information received by said receiving means;
    second discriminating means for discriminating an operation state of a second peripheral device connected to said communication apparatus itself; and
    display control means for selectively performing one of a first display and a second display on a display unit, the first display being performed when discrimination results by said first discriminating means and said second discriminating means indicate that the first and second peripheral devices are operable, and the second display being performed when the discrimination results by said first discriminating means and said second discriminating means indicate that the first and/or second peripheral devices are not operable.

2. An apparatus according to claim 1, wherein said receiving means receives the information at a communication start timing between said communication apparatus and the partner communication apparatus.

3. An apparatus according to claim 1, wherein said receiving means receives the information at intervals of a predetermined time after start of the communication start timing between said communication apparatus and the partner communication apparatus.

4. An apparatus according to claim 1, wherein said display unit includes a liquid crystal panel.

5. An apparatus according to claim 1, further comprising communication means for communicating at least one of an audio signal, an image signal and data with the partner communication apparatus.

6. A communication apparatus for communicating with a partner communication apparatus, comprising:
    receiving means for receiving information of an operation state of a first peripheral device connected to the partner communication apparatus;
    first discriminating means for discriminating the operation state of the first peripheral device according to the received information received by said receiving means;
    second discriminating means for discriminating an operation state of a second peripheral device connected to said communication apparatus itself;
    display control means for displaying the operation states of the first and second peripheral devices by icons according to discrimination results by said first discriminating means and said second discriminating means,
    wherein said display control means changes a display state according to the discrimination results by said first discriminating means and said second discriminating means.

7. An apparatus according to claim 6, wherein said receiving means receives the information at a communication start timing between said communication apparatus and the partner communication apparatus.

8. An apparatus according to claim 6, wherein said receiving means receives the information at intervals of a predetermined time after start of the communication start timing between said communication apparatus and the partner communication apparatus.

9. An apparatus according to claim 6, wherein said display unit includes a liquid crystal panel.

10. An apparatus according to claim 6, further comprising communication means for communicating at least one of an audio signal, an image signal and data with the partner communication apparatus.

11. A communication apparatus comprising:
    detecting means for detecting an operation state of a first peripheral device connected to said communication apparatus;
    receiving means for receiving information of an operation state of a second peripheral device connected to a partner communication apparatus;
    discriminating means for discriminating the operation state of each of the first and second peripheral devices according to the respective operation status information of the first and second peripheral devices; and
    output means for outputting detection result data and discrimination result data so as to display a detection result by said detecting means and a discrimination result by said discriminating means.

12. An apparatus according to claim 11, wherein said receiving means receives the information at a communication start timing between said communication apparatus and the partner communication apparatus.

13. An apparatus according to claim 11, wherein said receiving means receives the information at intervals of a predetermined time.

14. An apparatus according to claim 11, wherein said output means includes a liquid crystal panel.

15. An apparatus according to claim 11, further comprising communication means for communicating at least one of an audio signal, an image signal and data with the partner communication apparatus.

16. A communication apparatus comprising:
   first display means for displaying a first icon indicating a first peripheral device connected to said communication apparatus;
   second display means for displaying a second icon indicating a second peripheral device connected to a partner communication apparatus;
   instruction means for issuing an instruction in response to actuation of an arbitrary icon on said first display means or said second display means; and
   control means for controlling said apparatus to execute a communication operation between the first and second peripheral devices in accordance with corresponding instructions instructed by said instruction means in response to actuation of the corresponding icons.

17. An apparatus according to claim 16, wherein the first icon indicates an image input device and wherein the second icon indicates an image output device.

18. An apparatus according to claim 16, wherein the first icon indicates an image output device and wherein the second icon indicates an image input device.

19. An apparatus according to claim 16, wherein a display status of each of the first and second icons means indicates an operation status of the peripheral device indicated by the respective icon.

20. An image communication apparatus for executing an image communication of an image with a partner communication apparatus, comprising:
   receiving means for receiving information indicating a controllable function of an image input device connected to the partner communication apparatus, the information being different from the image;
   transmitting means for transmitting a control signal for use in controlling the image input device through the partner communication apparatus; and
   output means for outputting the information to display it on a display unit.

21. An apparatus according to claim 20, wherein the image input device is a camera.

22. An apparatus according to claim 20, wherein the controllable function includes at least one of pan, tilt and zoom operations.

23. An apparatus according to claim 20, wherein the information is displayed as an icon.

24. An image communication apparatus for executing an image communication of an image with a partner communication apparatus, comprising:
   receiving means for receiving information indicating a kind of image input device connected to the partner communication apparatus, the information being different from the image;
   transmitting means for transmitting a control signal for use in controlling the image input device through the partner communication apparatus; and
   output means for outputting the information to display it on display means.

25. An apparatus according to claim 24, wherein the image input device is a camera.

26. An apparatus according to claim 24, wherein the image input device is a write/picture camera.

27. An apparatus according to claim 24, wherein the information is displayed as an icon.

28. A communication method operative in a first communicating apparatus for communicating with a partner communication apparatus, comprising:
   a receiving steps of receiving information of an operation state of a first peripheral device connected to the partner communication apparatus;
   a first discriminating step of discriminating the operation state of the first peripheral device according to the received information received in said receiving steps;
   a second discriminating step for discriminating an operation state of a second peripheral device connected to the first communication apparatus; and
   selectively performing one of a first display and a second display on a display unit, the first display being performed when discrimination results by said first discriminating step and said second discriminating step indicate that the first and second peripheral devices are operable, and the second display being performed when the discrimination results by said first discriminating step and said second discriminating step indicate that the first and/or second peripheral devices are not operable.

29. A communication method operative in a first communication apparatus for communicating with a partner communication apparatus, comprising:
   a receiving step of receiving information of an operation state of a first peripheral device connected to the partner communication apparatus;
   a first discriminating step of discriminating the operation state of the first peripheral device according to the received information received in said receiving step;
   a second discriminating step of discriminating an operation state of a second peripheral device connected to the first communication apparatus;
   a display step of displaying the operation states of the first and second peripheral devices by icons according to discrimination results by said first discriminating step and said second discriminating step,
   wherein said display step changes a display state according to the discrimination results by said first discriminating step and said second discriminating step.

30. A communication method operative in a first communication apparatus, comprising the steps of:
   detecting an operation state of a first peripheral device connected to the first communication apparatus;
   receiving information of an operation state of a second peripheral device connected to a partner communication apparatus;
   discriminating the operation state of each of the first and second peripheral devices according to the respective operation status information of the first and second peripheral devices; and
   outputting detection result data and discrimination result data so as to display a detection result by said detecting step and a discrimination result by said discriminating step.

31. A method operative in a first communication apparatus comprising:
   a first display step of displaying, on a first display element, a first icon indicating a first peripheral device connected to the first communication apparatus;
   a second display step of displaying, on a second display element, a second icon indicating a second peripheral device connected to a partner communication apparatus;

an instruction step of issuing an instruction in response to actuation of an arbitrary icon on the first display element or the second display element; and a control step of controlling the first communication apparatus to execute a communication operation between the first and second peripheral devices in accordance with corresponding instructions instructed by said instruction step in response to actuation of the corresponding icons.

32. An method operative in a first image communication apparatus for executing an image communication of an image with a partner communication apparatus, comprising the steps of:

receiving information indicating a controllable function of an image input device connected to the partner communication apparatus, the information being different from the image;

transmitting a control signal for use in controlling the image input device through the partner communication apparatus; and outputting the information to display it on a display unit.

33. An image communication apparatus for executing an image communication of an image with a partner communication apparatus, comprising:

receiving means for receiving information indicating a kind of image input device connected to the partner communication apparatus, the information being different from the image;

transmitting means for transmitting a control signal for use in controlling the image input device through the partner communication apparatus; and output means for outputting the information to display it on display means.

* * * * *

UNITED STATES PATENT AND TRADEMARK OFFICE
CERTIFICATE OF CORRECTION

PATENT NO. : 5,815,080
DATED : September 29, 1998
INVENTOR(S): TOMISHIGE TAGUCHI It is certified that error appears in the above-identified patent and that said Letters Patent is hereby corrected as shown below:

COLUMN 1

Line 29, "transitted" should read --transmitted--.

COLUMN 2

Line 37, "hows" should read --shows--.

COLUMN 10

Line 2, "nicating" should read --nication--.

COLUMN 11

Line 10, "An" should read --A--.

Signed and Sealed this

Sixth Day of July, 1999

Attest:

Q. TODD DICKINSON

Attesting Officer   Acting Commissioner of Patents and Trademarks